C. F. CARSTENS & T. H. SCHWENCKE.
Manufacture of Window Glass.
No. 124,195.　　　　　　　　　　　Patented March 5, 1872.
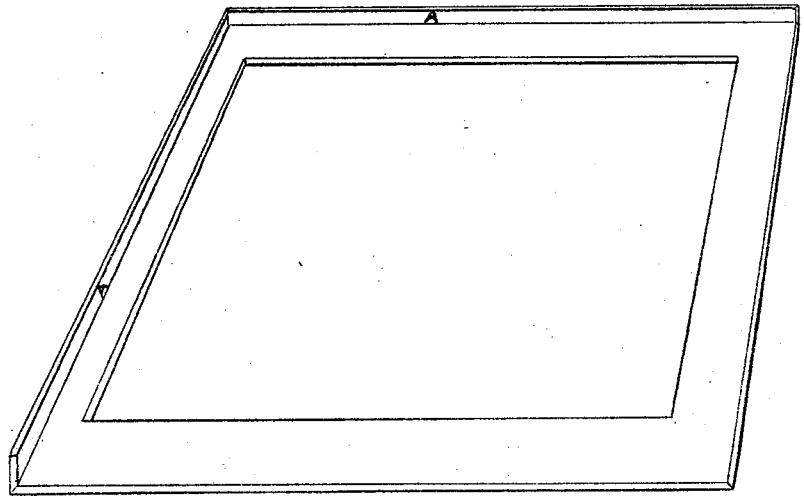
Witnesses
Will. Edgar
N. C. Gridley
Inventors
Christian F. Carstens
Theodor H. Schwencke
By Farwell & Co
their Attys

UNITED STATES PATENT OFFICE.

CHRISTIAN F. CARSTENS AND THEODOR H. SCHWENCKE, OF CHICAGO, ILL.

IMPROVEMENT IN THE MANUFACTURE OF WINDOW-GLASS.

Specification forming part of Letters Patent No. 124,195, dated March 5, 1872.

SPECIFICATION.

*To all whom it may concern:*

Be it known that we, CHRISTIAN F. CARSTENS and THEODOR H. SCHWENCKE, of Chicago, in the county of Cook and State of Illinois, have invented a new and Improved Process in the Manufacture of Concavo-Convex Window-Glass; and we do hereby declare the following to be a full, clear, and exact description thereof, which will enable others skilled in the art to make and use the same, reference being had to the accompanying drawing forming part of this specification, in which the figure is a perspective view of the frame used in our said process.

Our invention relates to an improved process for forming concavo-convex window-glass; and consists in forming such glass upon an open frame, as hereinafter more particularly described.

In forming concavo-convex window-glass, we take an ordinary straight or flat pane or light of glass of any desired dimensions and place the same upon an open frame, having a vertical flange upon one end and side thereof, as shown at A in the drawing, and which is made preferably of wrought-iron and of the dimensions desired, so that the edges of the pane of glass shall rest or lie upon the said frame and of one side and end thereof against said flange. The said frame with the pane of glass thereon is then placed in a suitable furnace or oven for the purpose of heating said glass until it becomes soft and from its own weight sinks within and slightly below the opening of said frame, when its sides or surfaces assume a concavo-convex shape or form and the edges or flat portion thereof resting upon said frame remain straight and all in the same plane, so that it can be inserted in a sash in the same manner as an ordinary flat pane or light of glass. For the purpose of equalizing the convexity of said glass during the time the same is in the furnace or oven, we gradually turn said frame horizontally and as often as desired, after which both frame and glass are removed from the furnace or oven and allowed to cool, whereby a concavo-convex window-glass, light, or pane, is formed without the use of tools or molds to depress the same. The said window-glass may have more or less convexity, according to the taste of the operator, or as desired. The flat portion around the edges may be merely wide enough to receive the putty, or wider, if desired.

By our said process in forming concavo-convex window-glass, the convex surface of the glass does not come in contact with the surface of any form or mold, and retains its original shine or polish, and consequently does not require the use of any tools to produce a shine or polish upon the surfaces thereof.

Having thus described the nature and object of our invention, what we claim as new, and desire to secure by Letters Patent, is—

The process of forming concavo-convex window-glass, with its edges all in the same plane and with its smoothness and transparency unaffected by coming in contact with any molding surface, by means of an open metallic frame, in the manner substantially as herein described.

The foregoing specification signed by us this 21st day of August, A. D. 1871.

CHRISTIAN F. CARSTENS.
THEODOR H. SCHWENCKE.

Witnesses:
N. C. GRIDLEY,
N. H. SHERBURNE.